3,222,127
MANUFACTURE OF ALUMINIUM CHLORIDE
Harry Brian Wilson, Little Gaddesden, near Berkhamstead, England, assignor to Laporte Titanium Limited, London, England, a company of Great Britain
No Drawing. Filed June 13, 1960, Ser. No. 35,451
Claims priority, application Great Britain, June 16, 1959, 20,680/59
12 Claims. (Cl. 23—93)

This invention relates to the manufacture of aluminium chloride and especially to the manufacture of aluminium chloride for use in incorporating alumina with titanium dioxide by introducing aluminium chloride vapour into a reaction vessel containing a fluidised bed in which titanium dioxide is being formed by a reaction between titanium tetrachloride and oxygen or an oxygen-containing gas.

It has been previously proposed to manufacture aluminium chloride by passing a stream of chlorine-containing gas over a static bed of heated aluminium metal, but considerable difficulties have been encountered because the reaction between the aluminium and the chlorine is extremely exothermic and the difficulty of removing the heat evolved usually leads to intense overheating, which causes sintering of the aluminium metal and erratic generation of aluminium chloride. Another factor that can cause erratic generation of the aluminium chloride when a static bed is used is irregular reaction resulting from the fact that the aluminium metal often has an oxide coating which hinders the reaction. When the aluminium chloride is to be used for incorporating alumina with titanium dioxide in the way referred to above, this erratic generation is unsatisfactory because it is important that the aluminium chloride vapour should be introduced into the fluidised bed at a controlled rate.

It has also been proposed to manufacture aluminium chloride by a process using a fluidised bed. In this process, a bed consisting of powdered aluminium diluted with a rather large quantity of inert particulate material is fluidised by the upward passage through the bed of chlorine diluted with large quantities of an inert gas. The dilution of both the reactants in this way means that it is necessary to use a relatively large apparatus in order to achieve a given rate of production of aluminium chloride, but it has previously been thought that the dilution of the aluminium powder by means of an inert particulate solid was necessary in order to avoid local overheating in the bed followed by fusion of the aluminium and consequent loss of fluidisation.

This invention is based on the observation that it is possible to manufacture aluminium chloride at a controlled rate by introducing chlorine into a fluidised bed of aluminium powder without adding any substantial quantity of inert particulate material provided that the chlorine is introduced not at the base of the bed, for example, through the perforations in a perforated plate situated at the base of the reactor, but into a well fluidised part of the bed so that it does not come into contact with unfluidised aluminium particles, and certain other conditions are observed.

The invention provides a process for the manufacture of aluminium chloride, which comprises maintaining a bed consisting substantially of aluminium particles in a fluidised condition by passing an inert gas upwardly through the bed, and separately introducing into the fluidised bed so produced chlorine or a mixture of chlorine and an inert gas, the chlorine or chlorine-containing gas being introduced through one or more inlets at a linear velocity equal to at least 10 times the linear velocity at which the inert fluidising gas flows through the bed (neglecting the presence of the particles making up the bed), the temperature within the fluidised bed being maintained within the range of from 100 to 600° C., the total rate of introduction of inert gas into the fluidised bed being at least twice the rate of introduction of chlorine into the fluidised bed on a volume basis, and the said inlet or inlets being so situated and arranged that, during a period of 30 minutes of continuous operation, no substantial blocking of the said inlet or inlets occurs.

Blocking of the inlet or inlets can readily be detected by a decrease in the rate of flow of the chlorine-containing gas into the bed if the pressure at which the chlorine-containing gas is supplied is kept constant or, alternatively, by an increase in the pressure need to maintain the rate of flow of the chlorine-containing gas substantially constant. In fact, if blocking of the inlet or inlets is taking place, it usually becomes apparent after a period of operation of considerably less than 30 minutes and, conversely, if no substantial blocking occurs within 30 minutes of starting operation, the process can usually be continued for a very much longer period without substantial blocking occurring.

Once it is appreciated that blocking can be avoided by locating the inlet or inlets so that the chlorine-containing gas enters a well-fluidised part of the bed and does not come into contact with unfluidised particles of aluminium, a suitable arrangement can readily be arrived at by one skilled in the art with the need for only a little experimental work which is of a comparatively simple nature. In general, a fluidised bed will be found to be well fluidised at points remote from the sides and base of the reactor and away from fixed members, for example, gas inlet pipes, situated within the bed. The thickness of the layer of unfluidised or poorly fluidised particles to be found adjacent to the walls of the reactor depends on the constructions of the reactor and, especially in the case of the depth of the layer adjacent to the base of the reactor, on the nature of the gas inlet or inlets for the inert fluidising gas.

When the inert fluidising gas is introduced into the reactor through discrete perforations in a plate at the base of the reactor, it will usually be found that, between the perforations, the particles immediately above the plate are not well fluidised. The depth of this poorly fluidised region depends on the distance between adjacent perforations, being greater the greater the distance between the perforations. If the plate, instead of having discrete perforations, is porous, then the depth of this poorly fluidised region will be decreased, but it does not disappear entirely.

In addition to arranging the inlet or inlets for the chlorine or chlorine-containing gas in such manner that the chlorine does not come into contact with any unfluidised aluminium particles, it is of course also important that the chlorine or chlorine-containing gas stream or streams should not impinge directly on to a part of the reactor (including, for example, inlet pipes or other members associated with the inlet for the inert fluidising gas), especially where such part is made of a material capable of undergoing reaction with chlorine at the temperature prevailing within the fluidised bed.

For efficient operation, the chlorine or chlorine-containing gas should be introduced into the fluidised bed not less than 2 inches below the top of the bed.

The process enables aluminium chloride having a high degree of purity to be produced at an accurately controllable rate, and it is thought that one reason for this (in addition to the avoidance of sintering of the aluminium) is that any oxide that there may be on the surface of the aluminium is removed by the self-cleansing action that the aluminium particles have as a result of their turbulent motion in the fluidised bed.

The size of the aluminium particles forming the fluidised bed is advantageously within the range of from 30 to 150 mesh B.S.S., but may be as large as 10 mesh B.S.S.

The temperature within the fluidised bed is advantageously maintained within the range of from 250 to 500° C.

When the temperature within the fluidised bed does not exceed 400° C., the inert gas used for fluidising the bed may be titanium tetrachloride. Advantageously, the inert gas used for fluidising the bed is nitrogen.

The chlorine is advantageously introduced into the fluidised bed in admixture with an inert gas, the proportion of the inert gas introduced in admixture with the chlorine being advantageously at least 20% (preferably 40%) by volume of the quantity of chlorine introduced. The inert gas introduced in admixture with the chlorine is preferably nitrogen, or (when the temperature of the bed does not exceed 400° C.) the inert gas may be titanium tetrachloride vapour, or a mixture of nitrogen and titanium tetrachloride vapour.

The total rate of introduction of inert gas into the fluidised bed is advantageously within the range of from 6 to 12 times the rate of introduction of chlorine into the bed on a volume basis.

The inert fluidising gas may be introduced into the bed through a plate located at the base of the bed and fitted with discrete perforations, and the chlorine or chlorine-containing gas is introduced into the fluidised bed at a height above the plate at least equal to the shortest distance separating the centres of two of the perforations and not less than 2 inches (preferably not less than 4 inches). Advantageously, the inert fluidising gas is introduced into the bed through a porous plate situated at the base of the bed, and the chlorine or chlorine-containing gas is introduced substantially vertically upwards into the fluidised bed at a height of at least ½ inch (preferably 1 inch) above the plate.

The chlorine or chlorine-containing gas is advantageously introduced into the fluidised bed through an inlet situated on the central vertical axis of the reactor or through a plurality of inlets situated towards that axis. Preferably, the said inlet or inlets are directed downwardly.

The chlorine or chlorine-containing gas is preferably introduced into the fluidised bed at a linear velocity equal to at least 50 times the linear velocity at which the inert fluidising gas flows through the bed (neglecting the presence of the particles making up the bed). By introducing the chlorine or chlorine-containing gas into the bed at a relatively high velocity, the risk that particles of aluminium may enter the inlet or inlets for this gas is minimised.

Because the process enables aluminium chloride having a high degree of purity to be produced at an accurately controllable rate, it is especially suitable for supplying aluminium chloride for use in incorporating alumina with titanium dioxide in the way referred to above. Accordingly, the invention also provides a process for the manufacture of titanium dioxide incorporating alumina, which comprises oxidising aluminium chloride vapour in a system in which titanium tetrachloride is undergoing oxidation so as to produce titanium dioxide incorporating alumina, the aluminium chloride having been produced by the process specified above. The oxidation may be carried out in any known manner, but is advantageously carried out in a fluidised bed. Preferably, the aluminium chloride vapour is oxidised in a fluidised bed in which titanium dioxide particles are being formed by the oxidation of titanium tetrachloride vapour. The titanium tetrachloride and aluminium chloride vapours may be introduced into the oxidation fluidised bed in admixture with one another, but they are advantageously introduced separately. Preferably, the ratio of the quantity of aluminium chloride introduced into the oxidation fluidised bed to the quantity of titanium tetrachloride introduced into the oxidation fluidised bed is such that the proportion of alumina present in the product is within the range of from 0.5 to 5% by weight based on the total weight of alumina and titanium dioxide produced.

Another application of the invention is to the removal of chlorine from the residual gases from a process such as, for example, a process for the manufacture of titanium tetrachloride by reacting titanium dioxide with chlorine. The residual gases, either before or after the titanium tetrachloride has been removed from them, form the chlorine-containing gas and substantially all the chlorine content of the residual gases is removed by reaction with the aluminium. After passing through a suitable condensing system, the residual gases can then safely be discharged into the atmosphere.

The following examples illustrate the invention:

*Example 1*

The process was carried out in a cylindrical stainless steel vessel, which was mounted with its axis vertical and had an internal diameter of 4 inches and a height of 2 feet. The base of the vessel was formed with a gas entry port and a porous gas-distributor plate was fitted a short distance above the base. Passing vertically through the centre of the porous plate and the base of the vessel, there was a capillary tube made of heat-resistant glass and having an internal diameter of 2 millimetres. The upper end portion of the tube was bent through 180° so that the end of the tube, which was open and situated at a height of 5 inches above the porous plate, was directed vertically downwards. An outlet was provided at the top of the vessel.

The reaction vessel was charged with 5 pounds of aluminium powder having particle sizes within the range of $-36+100$ mesh B.S.S. Nitrogen was introduced into the reaction vessel through the capillary tube at a rate of 20 cubic feet per hour and through the gas entry port at a rate of 120 cubic feet per hour. The nitrogen introduced through the gas entry port passed into the bed through the porous plate and maintained the bed in a fluidised condition, the depth of the bed when fluidised being 9½ inches. The fluidising nitrogen introduced through the gas entry port flowed through the bed at a linear velocity of 0.382 feet per second calculated at atmospheric temperature, and neglecting the presence of the particles making up the bed. The nitrogen introduced through the capillary tube entered the reaction vessel at a linear velocity of 164 feet per second calculated at atmospheric temperature, and served to prevent fluidised particles of aluminium from entering the capillary tube.

The reaction vessel was heated electrically until the fluidised bed reached a temperature of 150° C. when, in addition to the nitrogen, chlorine was introduced into the reaction vessel at a rate of 12 cubic feet per hour. The linear velocity at which this mixture of nitrogen and chlorine entered the reaction vessel from the capillary tube, was 263 feet per second calculated at atmospheric temperature. Accordingly, this mixture of nitrogen and chlorine entered the reaction vessel at a linear velocity equal to 688 times the linear velocity at which the fluidising nitrogen flowed through the bed (neglecting the presence of the particles making up the bed). The electrical heating was then switched off and the apparatus was allowed to lose heat to the surrounding air.

The process was continued for a period of 2 hours (excluding the preliminary warming-up period before the feed of chlorine to the bed was started) and throughout this period the pressure necessary to maintain the rate of feed of the mixture of nitrogen and chlorine through the capillary tube constant diminished slightly as the depth, and consequently the resistance, of the bed decreased. This indicated that no substantial blocking of the capillary tube was occurring. During the first hour, the temperature of the fluidised bed rose gradually to approximately 400° C., after which it remained substantially constant.

The average rate of production of aluminium chloride was 2.8 pounds per hour, and this must have remained substantially constant because the rate of feed of chlorine to the reaction vessel was kept constant and the gases leaving the reaction vessel were found to contain no free chlorine in each of a number of checks carried out at intervals during the process.

At the end of the period of 2 hours, the supply of chlorine was cut off, but the supply of nitrogen to both the gas entry port and the capillary tube was maintained until the bed had cooled. The bed and the interior of the reaction vessel were then examined and no trace of sintering of the aluminium was found. The bed was weighed and it was found that aluminium had been consumed from the bed at an average rate of 0.57 pound per hour.

*Example 2*

The process was carried out in the same way and using the same reaction vessel as in Example 1, but the reaction vessel was fitted with external gas heating means instead of electrical heating means and the rate of introduction of chlorine into the reaction vessel through the capillary tube was 15 cubic feet per hour instead of 12 cubic feet per hour. The mixture of nitrogen and chlorine entered the reaction vessel from the capillary tube at a linear velocity of 288 feet per second calculated at atmospheric temperature. Accordingly, this mixture of nitrogen and chlorine entered the reaction vessel at a linear velocity equal to 755 times the linear velocity at which the fluidising nitrogen flowed through the bed (neglecting the presence of the particles making up the bed).

The temperature of the fluidised bed rose to 390° C. in approximately ¾ hour from the time at which the feed of chlorine was started and thereafter remained constant throughout the further 2¼ hours for which the process was continued. Throughout the total period of 3 hours for which the process was continued, the pressure necessary to maintain the rate of feed of the mixture of nitrogen and chlorine through the capillary tube constant diminished slightly as the depth, and consequently the resistance, of the bed decreased. This indicated that no substantial blocking of the capillary tube was occurring.

The average rate of production of aluminium chloride was 3.5 pounds per hour and this must have remained substantially constant because the rate of feed of chlorine to the reaction vessel was kept constant and the gases leaving the reaction vessel were found to contain no free chlorine in each of a number of checks carried out at intervals during the process.

At the end of the period of 3 hours, the feed of chlorine was stopped and the bed was allowed to cool under the same conditions as in Example 1. The bed and the interior of the reaction vessel were examined and no evidence of sintering or fusion of the bed could be found.

*Example 3*

The reaction vessel used in Example 2 was fitted with a solids entry port, which was situated in the side wall of the vessel above the level of the end of the capillary tube. A hopper, which could be pressurized with nitrogen was connected to this port through a control valve.

As in Examples 1 and 2, 5 pounds of aluminium powder having particle sizes in the range of —36 +100 B.S.S. were introduced into the reaction vessel to form a bed. Nitrogen was introduced into the reaction vessel through the capillary tube at a rate of 20 cubic feet per hour and through the gas entry port at a rate of 120 cubic feet per hour. The nitrogen introduced through the gas entry port passed into the bed through the porous plate and maintained the bed in a fluidised condition. When fluidised, the bed had a depth of 9½ inches and covered the solids entry port. As in Examples 1 and 2, the nitrogen introduced into the reaction vessel through the capillary tube served to prevent fluidised particles of aluminium from entering the capillary tube.

The reaction vessel was heated (using the external gas heating) until the temperature of the fluidised bed reached 150° C., when the external heating was stopped, chlorine was introduced into the reaction vessel through the capillary tube at a rate of 10 cubic feet per hour and the rate of feed of nitrogen through the capillary tube was decreased to 10 cubic feet per hour. The linear velocity at which the mixture of nitrogen and chlorine entered the reaction vessel was 164 feet per second calculated at atmospheric temperature. Accordingly, this mixture of nitrogen and chlorine entered the reaction vessel at a linear velocity equal to 430 times the linear velocity at which the fluidising nitrogen flowed through the bed (neglecting the presence of the particles making up the bed).

The process was continued for 17 hours (neglecting the preliminary warming-up period) and throughout this period charges each consisting of 1 pound of aluminium powder were added to the bed from the hopper via the control valve at intervals of 2 hours.

Chlorination proceeded smoothly and the temperature of the bed rose until it reached about 260° C. Each time a fresh charge of aluminium powder was added to the bed, the temperature of the bed fell approximately 30° C., but it recovered to about 260° C. in about 10 minutes.

The average rate of production of aluminium chloride was 2.35 pounds per hour, and this must have remained substantially constant because the rate of feed of chlorine to the reaction vessel was kept constant and the gases leaving the reaction vessel were found to contain no free chlorine in each of a number of checks carried out at intervals during the process.

No evidence of blocking of the gas inlets was detected during the carrying out of the process and examination of the bed and the interior of the reaction vessel (after the process had been terminated and the bed allowed to cool under the same conditions as in Example 1) revealed no evidence of sintering of the bed or of any blockage of the gas inlets.

*Example 4*

The process was carred out in the apparatus described in Example 1, but this was modified in certain respects. The capillary tube was replaced by an Inconel tube which has a bore of ¼ inch and which passed vertically through the centre of the porous gas-distributor plate. This tube extended approximately ½ inch above the porous plate and terminated in an open end. Also, the electrical heating means for heating the reaction vessel was replaced by a water jacket for controlling the rise in temperature of the reaction vessel that results from the exathermic nature of the reaction. Finally, a gas heater was provided for heating the tube through which the nitrogen was fed to the reaction vessel.

5 pounds of aluminium particles having a size range of —36 +100 mesh B.S.S. were introduced into the reaction vessel and the resulting bed was fluidised by passing nitrogen, which had been pre-heated to a temperature of 300° C., upwardly through the porous plate at a rate of 120 cubic feet per hour. At the same time, a stream of unheated nitrogen was introduced into the reaction vessel through the Inconel tube at a rate of 20 cubic feet per hour to prevent particles of aluminium from entering the Inconel tube through the open upper end thereof.

When the temperature of the bed reached 150° C., chlorine was introduced into the reaction vessel through the Inconel tube at a rate of 10 cubic feet per hour, and the rate of introduction of nitrogen through this tube was decreased to 10 cubic feet per hour. The linear velocity at which the mixture of nitrogen and chlorine entered the reaction vessel from the Inconel tube was 16.3 feet per second calculated at atmospheric temperature. At the same time, the rate at which the fluidising nitrogen was introduced into the reaction vessel through the porous plate was decreased to 80 cubic feet per hour, and the gas heater was switched off so that the temperature of the fluidising nitrogen being fed to the reaction vessel fell to room temperature. The mixture of nitrogen and chlorine entered the reaction vessel at a linear velocity equal to 64 times the linear velocity at which the fluidising nitrogen flowed through the bed (neglecting the presence of the particles making up the bed).

As a result of the heat evolved by the exothermic reaction between the chlorine and the aluminium, the temperature of the bed rose until, when it reached 350° C., the water jacket was used to maintain the bed at that temperature.

Aluminium particles were introduced into the reaction vessel at the rate of 1 pound every 2 hours through a feed pipe leading from a pressurized hopper. The gases leaving the reaction vessel were found to contain no free chlorine in each of a number of checks carried out at intervals during the process.

The process was continued for a period of 3 hours (excluding the preliminary warming-up period before the feed of chlorine to the bed was started) and, at the end of that period, the supply of chlorine was cut off, but the flow of nitrogen through both the Inconel tube and the porous plate was continued until the bed had cooled. The bed and the interior of the reaction vessel were then examined, and the aluminium powder showed no sign of fusion and was free-flowing. There was also no evidence of any blockage of the gas inlets.

I claim:

1. A process for the manufacture of aluminum chloride, which comprises maintaining a bed consisting substantially of aluminium particles in a fluidised condition in a an inert gas upwardly through the bed, and separately in- fluidisation zone having zone bounding walls by passing troducing into the fluidised aluminium particles so produced a chlorinating gas selected from the group consisting of chlorine and a mixture of chlorine and an inert gas, the chlorinating gas being introduced at an intermediate zone in the fluidised bed which is remote from said zone bounding walls at a linear velocity equal to at least 10 times the linear velocity at which the inert fluidising gas is introduced, the temperature within the fluidised bed being maintained within the range of from 100 to 600° C., the total rate of introduction of inert gas into the fluidised bed being at least twice the rate of introduction of chlorine into the fluidised bed on a volume basis.

2. A process as claimed in claim 1, wherein the size of the aluminium particles forming the fluidised bed is within thet range of from 30 to 150 mesh B.S.S.

3. A process as claimed in claim 1, wherein the temperature within the fluidised bed is maintained within the range of from 250 to 500° C.

4. A process as claimed in claim 1, wherein the total rate of introduction of inert gas into the fluidised bed is within the range of from 6 to 12 times the rate of introduction of chlorine into the bed on a volume basis.

5. A process as claimed in claim 1, wherein the chlorinating gas comprises residual chlorine-containing gas from a process for the manufacture of titanium tetrachloride by reacting titanium dioxide with chlorine, and substantially all the chlorine content of the chlorinating gas is removed by reaction with the aluminium.

6. A process for the manufacture of aluminium chloride, which comprises maintaining a bed consisting substantially of aluminium particles in a fluidised condition in a fluidisation zone having zone bounding walls by passing an inert gas upwardly through the bed, and separately introducing into the fluidised aluminium particles so produced a chlorinating gas that is a mixture of chlorine and an inert gas, the proportion of inert gas introduced in admixture with the chlorine being at least 20% by volume of the quantity of chlorine introduced, the chlorinating gas being introduced at an intermediate zone in the fluidised bed which is remote from said zone bounding walls at a linear velocity equal to at least 10 times the linear velocity at which the inert fluidising gas is introduced, the temperature within the fluidised bed being maintained within the range of from 100 to 600° C., the total rate of introduction of inert gas into the fluidised bed being at least twice the rate of introduction of chloride into the fluidised bed on a volume basis.

7. A process as claimed in claim 6, wherein the proportion of the inert gas introduced in admixture with the chlorine is at least 40% by volume of the quantity of chlorine introduced, and the inert gas is selected from the group consisting of nitrogen, titanium tetrachloride vapour, and a mixture of nitrogen and titanium tetrachloride vapour, and when the said inert gas introduced in admixture with the chlorine comprises titanium tetrachloride the temperature within the fluidised bed is maintained at a temperature within the range of from 100 to 400° C.

8. A process for the manufacture of aluminium chloride, which comprises maintaining a bed consisting substantially of aluminium particles in a fluidised condition in a fluidisation zone having side and bottom zone bounding walls by introducing an inert gas upwardly into the bed through said bottom wall, and separately introducing into the fluidised aluminium particles so produced a chlorinating gas selected from the group consisting of chlorine and a mixture of chlorine and an inert gas, the chlorinating gas being introduced at an intermediate zone in the fluidised bed which is remote from said zone bounding walls at a linear velocity equal to at least 10 times the linear velocity at which the inert fluidising gas is introduced, the temperature within the fluidised bed being maintained within the range of from 100 to 600° C., the total rate of introduction of inert gas into the fluidised bed being at least twice the rate of introduction of chlorine into the fluidised bed on a volume basis.

9. A process as claimed in claim 8, wherein the chlorinating gas is introduced in a downward direction into the fluidised aluminium particles.

10. A process for the manufacture of aluminium chloride, which comprises maintaining a bed consisting substantially of aluminium particles in a fluidised condition in a fluidisation zone haivng side and bottom zone bounding walls by introducing an inert gas upwardly into the bed through said bottom wall, and separately introducing into the fluidised aluminium particles so produced a chlorinating gas selected from the group consisting of chlorine and a mixture of chlorine and an inert gas, the chlorinating gas being introduced in a substantially vertically upward direction at an intermediate zone of the fluidised bed which is remote from said zone bounding walls at a linear velocity equal to at least 10 times the linear velocity at which the inert fluidising gas is introduced, the temperature within the fluidised bed being maintained within the range of from 100 to 600° C., the total rate of introduction of inert gas into the fluidised bed being at least twice the rate of introduction of chlorine into the fluidised bed on a volume basis.

11. A process for the manufacture of aluminium chloride, which comprises maintaining a bed consisting substantially of aluminium particles in a fluidised condition in a fluidisation zone having side and bottom zone bounding walls by introducing an inert gas upwardly into the bed through said bottom wall, and separately introducing into the fluidised aluminium particles so produced a chlorinating gas selected from the group consisting of chlorine and a mixture of chlorine and an inert gas, the chlorinating gas being introduced in a downward direction at an intermediate zone in the fluidised bed which is remote from said zone bounding walls at a linear velocity equal to at least 10 times the linear velocity at which the inert fluidising gas is introduced, the temperature within the fluidised bed being maintained within the range of from 100 to 600° C., the total rate of introduction of inert gas into the fluidised bed being at least twice the rate of introduction of chlorine into the fluidised bed on a volume basis, 12. A process for the manufacture of aluminium chloride, which comprises maintaining a bed consisting substantially of aluminium particles in a fluidised condition in a fluidisation zone having zone bounding walls by passing an inert gas upwardly through the bed, and separately introducing into the fluidised aluminium particles so produced a chlorinating gas selected from the group consisting of chlorine and a mixture of chlorine and an inert gas, the chlorinating gas being introduced at an intermediate zone in the fluidised bed which is remote from said zone bounding walls at a linear velocity equal to at least 50 times the linear velocity at which the inert fluidising gas is introduced, the temperature within the fluidised bed being maintained within the range of from 100 to 600° C., the total rate of introduction of inert gas into the fluidised bed being at least twice the rate of introduction of chlorine into the fluidised bed on a volume basis.

References Cited by the Examiner
UNITED STATES PATENTS

| | | | |
|---|---|---|---|
| 2,020,431 | 11/1935 | Osborne et al. | 23—92 XR |
| 2,084,290 | 6/1937 | McAfee | 23—95 |
| 2,291,206 | 7/1942 | Bowes | 23—87 XR |
| 2,621,118 | 12/1952 | Cyr et al. | 23—87 XR |
| 2,790,704 | 4/1957 | Lewis | 23—92 XR |
| 2,868,621 | 1/1959 | Giraitis | 23—87 |
| 2,943,066 | 6/1960 | Arnold et al. | 252—463 |
| 2,978,420 | 4/1961 | McCulloch et al. | 252—463 |

MAURICE A. BRINDISI, *Primary Examiner.*

JULIUS GREENWALD, GEORGE D. MITCHELL,
*Examiners.*